United States Patent
Rathnavelu

[19]

[11] Patent Number: 5,914,934
[45] Date of Patent: Jun. 22, 1999

[54] ADAPTIVE TIME SLOT SCHEDULING APPARATUS AND METHOD FOR END-POINTS IN AN ATM NETWORK

[75] Inventor: Sunder R. Rathnavelu, Marlboro, N.J.

[73] Assignee: Lucent Technologies Inc, Murray Hill, N.J.

[21] Appl. No.: 08/758,611

[22] Filed: Nov. 27, 1996

Related U.S. Application Data

[63] Continuation-in-part of application No. 08/580,470, Dec. 28, 1995, Pat. No. 5,751,709.

[51] Int. Cl.$^6$ .................................................. H04L 12/56
[52] U.S. Cl. ............................................ 370/229; 370/395
[58] Field of Search .................................... 370/395, 397, 370/464, 465, 428, 412, 444, 455, 229, 230, 231, 232, 233, 234, 235, 252, 389, 442, 411, 400, 396, 399, 429, 468, 477, 452, 460, 516

[56] References Cited

U.S. PATENT DOCUMENTS 5,572,523  11/1996  Katsube et al. .......................... 370/397
5,579,480  11/1996  Cidon et al. .............................. 370/397

OTHER PUBLICATIONS

Sunder Rathnavelu, "Adaptive Time Slot: A Scheduling Scheme for ATM end points," IEEE, pp. 2118–2122 (1996).
"ATM Forum Technical Committee—Traffic Management Specification, Version 4.0," (Feb. 1996).

*Primary Examiner*—Dang Ton

[57] ABSTRACT

A scheduling mechanism for satisfying specified Quality of Service guarantees for each VC of an end-point host in an ATM network and for satisfying low latency requirements of certain VCs while maintaining high throughput. The scheduling mechanism includes at least one time slot ring, a VC table and at least two pending queues. The time slot ring is an array of time slots grouped into clusters. Each slot contains a pointer which contains the virtual channel identifier to be serviced. The VC table is an array of all the VC descriptors. The pending queues are used for queuing a new VC and when the scheduler is unable to find a time slot for a VC it is queued in the pending queue. One pending queue is restricted to VCs requiring low latency and thus need to be serviced prior to servicing other VCs not sharing the same low latency requirements. A second pending queue is used for VCs with a less critical latency requirement. The ring contains cluster pointers which point to the first VC to be serviced. The rest of the VCs in the cluster are linked to the first VC. In order to accommodate different classes of service, each entry in the ring holds multiple cluster pointers. The scheduler first processes all low latency VCs, and then circularly reads and processes one cluster at a time at the maximum speed allowed by the physical link, and a current slot pointer points to the slot being serviced. For the current time slot, the scheduler first services the VC waiting on this slot, then schedules a new target time slot for this VC after marking the current slot empty.

15 Claims, 2 Drawing Sheets

ADAPTIVE TIME SLOT SCHEDULING APPARATUS AND METHOD FOR END-POINTS IN AN ATM NETWORK

CROSS REFERENCE TO RELATED APPLICATIONS

The present patent application is a continuation in part of U.S. patent application Ser. No. 08/580,470, now U.S. Pat. No. 5,751,709 entitled ADAPTIVE TIME SLOT SCHEDULING APPARATUS AND METHOD FOR END-POINTS IN AN ATM NETWORK, that application having a filing date of Dec. 28, 1995, and which is related to U.S. patent application Ser. No. 08/579,961, now U.S. Pat. No. 5,712,851 entitled ADAPTIVE TIME SLOT SCHEDULING APPARATUS AND METHOD UTILIZING A LINKED LIST MECHANISM, having a filing date of Dec. 28, 1995. Present, parent and related applications have a common assignee, one or more common inventors and are copending. The parent and related application are hereby incorporated by reference.

FIELD OF THE INVENTION

The present invention relates generally to the field of telecommunications systems, and more particularly to an adaptive time slot scheduling scheme for end-points in ATM networks and particularly suited for providing low latency to a lock manager function in distributed processing systems.

BACKGROUND OF THE INVENTION

Asynchronous Transfer Mode (ATM) networks allow a large number of data flow paths or Virtual Channels (VCs) to be statistically multiplexed over a common link. A high speed ATM connection allows a host end-point device, for example, a computer, to have a large number of simultaneous virtual channels sharing bandwidth of the common link. A challenge in implementing the large number of virtual channels is to achieve specified Quality of Service (QOS) for each virtual channel independent of other virtual channels. The challenge is compounded when a mix of virtual channels with differing requirements for the QOS have to be satisfied.

In order to efficiently accommodate the differing QOS requirements of multiple virtual channels, a scheduler in an end-point device should be able to respond quickly to changes in transmission rates on the individual virtual channels. This is required, for example, for the Variable Bit Rate (VBR) and the best effort or Available Bit Rate (ABR) classes of service. The scheduler should also be able to dynamically adjust the scheduling when new virtual channels are added or old ones are removed or existing virtual channels stop or start sending data temporarily. In addition, the scheduler should also minimize the jitter, that is, changes in cell rate. This is important because ATM switches, which receive streams of cells generated by the scheduler, continuously monitor each VC using a leaky bucket algorithm or Generic Cell Rate Algorithm (GCRA) to check if the switch is adhering to the traffic contract. In the event the leaky bucket overflows, the cells can potentially be dropped by the switch. Accordingly, the scheduler should protect against this by minimizing the jitter. In case of constant bit rate (CBR) channels, a buffer is required at the receiving end to remove the jitter and smooth the incoming flow of cells. Increased jitter will then require a larger buffer.

Scheduling schemes have been proposed in the prior art for scheduling VCs within a switch and within an end-point. Heretofore, these schemes have been unable to meet the requirements necessary for efficient implementation of multiple virtual channels having various transmission rates and differing QOS guarantees. Accordingly, there is a need for a scheduling mechanism capable of implementing specified transmission rates for each virtual channel independent of other virtual channels, wherein the virtual channels include a mix of differing QOS requirements. U.S. patent application Ser. No. 08/580,470, now U.S. Pat. No. 5,751,709 the parent of the present application addresses this need.

A scheduler in an end-point device should also be able to accommodate a low latency QOS requirement of an individual virtual channel. One application where low latency is of concern is the use of an ATM network to build a parallel processing system where individual workstations act as nodes and the ATM network functions as the fabric for inter-processor communication. In this ATM network application it is necessary to have a lock manager, whose messages are typically short and infrequent, for locking a resource when it is accessed by one processor, thereby preventing access to the resource to more than one processor at a time. Since a principal objective for using the ATM network for parallel processing is the potential for increased throughput, the ATM network is a stable fabric. However, the increased throughput is achieved at the expense of high latency. With respect to the lock manager, this cost is very serious as end points are prevented from accessing a resource until it is released by the lock manager operation. Thus reducing latency for the lock manager is critical to realizing high throughout.

SUMMARY OF THE INVENTION

The present invention discloses an apparatus and method for realizing low latency while maintaining high throughput for high priority operations such as lock manager, conveyed in a specific virtual channel (VC) generated by an end-point host in an ATM network. In order to satisfy the specified low latency requirement for the specific VC, the present invention uses a scheduler which utilizes a time slot ring. As the VC's with the less critical latency requirements have specific rates in terms of cells per second, the time slot ring is only defined for these VC's. The scheduler dynamically fills in the various slots of the time slot ring with different VCs to be serviced, and services them only after first servicing all VCs having a low latency requirement.

In one preferred embodiment of the present invention, the scheduler includes a time slot ring, a VC table and at least two pending queues. The time slot ring is an array, wherein each element represents a time slot. The size of the time slot ring is determined by the ratio of the highest rate to the lowest rate to be supported. The VC table is an array of all the VC descriptors. The pending queues are used for queuing a new VC. At least two pending queues are used; one for those VCs requiring low latency and therefore need to be serviced first and the other or others for VCs with less strict latency requirements so that they can be serviced after the first pending queue is empty. Where more than two pending queues are used, service of various levels of latency is possible.

The size of the ring and consequently the memory required to store the ring can be reduced by combining a fixed number of consecutive time slots. Each cluster nominally holds a "Cluster-Size" number of slots. The ring contains cluster pointers which point to the first VC to be serviced. The rest of the VCs in the cluster are linked to the first VC. In order to accommodate different classes of service, each entry in the ring holds two cluster pointers: the High Priority Pointer (HPP) which services the VBR/CBR traffic classes and a Low Priority Pointer (LPP) which services VCs belonging to the ABR/VBR classes.

In calculating the target slot, the scheduler calculates the target cluster. This acts to decrease the memory requirements, but at the expense of reduced accuracy in calculating the target slot since it has to be approximated to the nearest cluster. A variable called the CCTP (Current Cell Time Pointer) is used in all the timing calculations. The CCTP increments every time slot without regard to the cluster size and ensures accuracy of time delay calculations. A Current Cell Time Pointer (CCTP) increments every cell time and points to the cell position which will be sent if the scheduler is not backlogged. A set of Current Slot Pointers (CSHPP and CSLPP) point to the current slot which is being serviced. In a second embodiment of the present invention, a plurality of time slot rings are used to accommodate multiple classes of traffic as defined by the ATM Forum Traffic Management Specification 4.0, hereby incorporated by reference as if fully set forth herein. Multiple time slot rings allow different traffic classes to have different priorities dependent on how the scheduler services the time slot rings. One example of this embodiment uses two rings: a high priority ring for VBR/CBR traffic, and a low priority ring for ABR/VBR traffic.

BRIEF DESCRIPTION OF THE FIGURES

For a better understanding of the present invention, reference may be had to the following description of exemplary embodiments thereof, considered in conjunction with the accompanying drawings, in which.

DETAILED DESCRIPTION OF THE INVENTION

Figure 1:
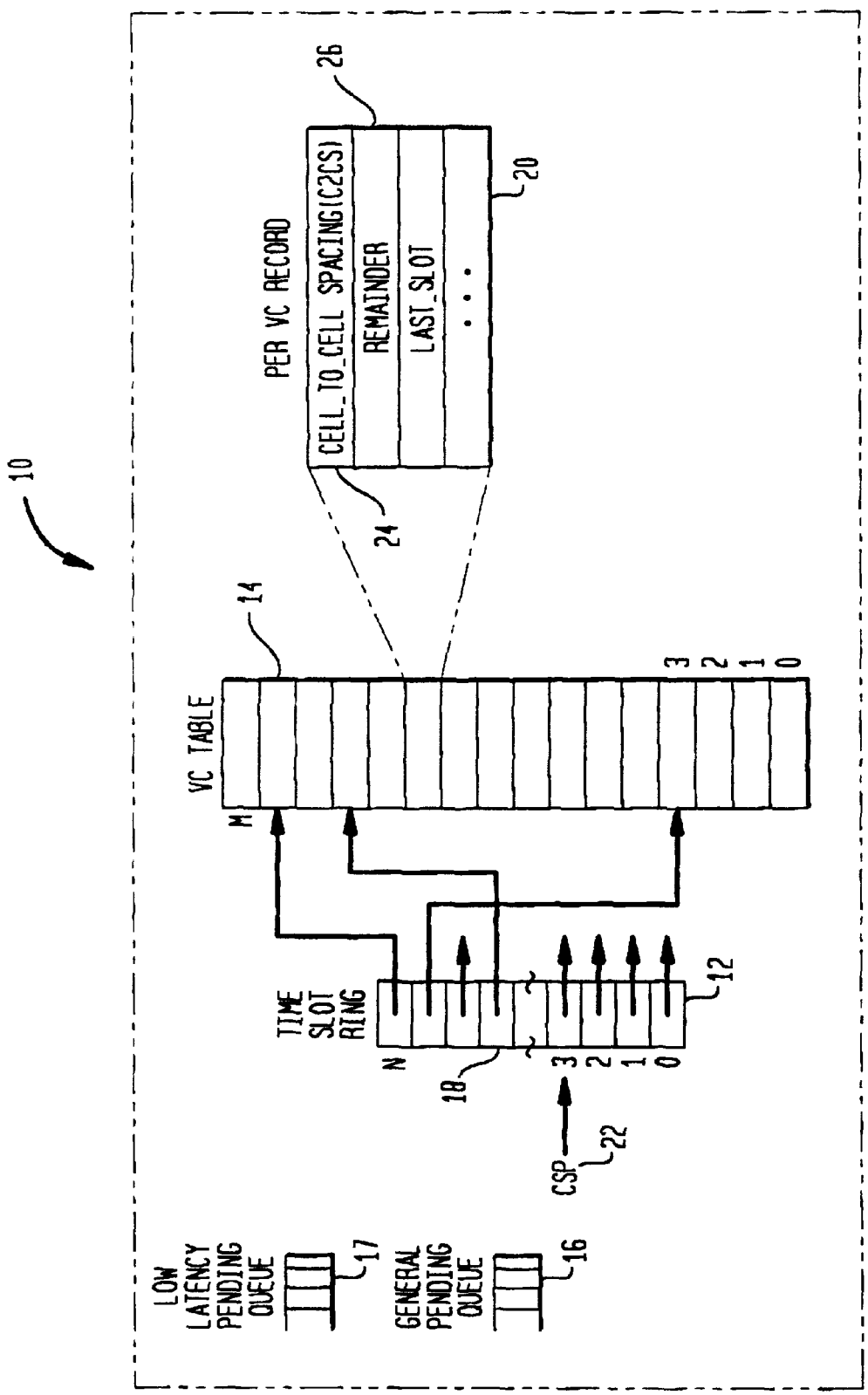
FIG. 1 shows a diagram of basic elements included in the present invention adaptive time slot scheduling mechanism.

The present invention discloses an apparatus and method for adaptive time slot scheduling at end-points in an ATM network which provides low latency to critical operations while maintaining high throughput. Referring to FIG. 1, there is shown a block diagram illustrating one preferred embodiment of a scheduling mechanism 10 according to the present invention. As shown, the scheduling mechanism or scheduler 10 is contained, for example, in an end-point host of an ATM network. The basic components of scheduler 10 include a time slot ring 12, a VC table 14 and at least two pending queues 16 and 17. The time slot ring 12 is essentially an array found in memory, for example, wherein each element in the array represents a specific time slot 18. Each time slot 18 contains a pointer which includes the virtual channel identifier (VCID) which identifies the virtual channel to be serviced in this time slot. The VCID points to a VC descriptor 20 in the VC table 14 which stores all the information regarding the specific VC. If the slot 18 is empty, a null pointer is contained therein.

Pending queues 16 and 17 are queues of VCIDs and used for queuing a new VC. As shown in FIG. 1, pending queue 17 is a queue of VCIDs having a quality of service requirement of low latency, and pending queue 16 is a queue of all VCIDs other than those in pending queue 17. In accordance with the present invention, pending queue 17 has priority over pending queue 16 at the time of scheduling. In a preferred embodiment of the present invention, the scheduler is included as part of a Segmentation and Reassembly (SAR) in an Application Specific Integrated Circuit (ASIC).

In the basic operation of the scheduler 10 shown in FIG. 1, the scheduler 10 in conjunction with a built-in processor reads and processes one slot at a time in the time slot ring at a predetermined rate, for example, the maximum speed that the physical link of the end-point device will allow. The scheduler 10 then circularly services the slots in ring 12 in a continuous fashion. A current slot pointer (CSP) 22 points to the slot being serviced. For a current time slot, i.e., the slot referenced by the CSP, the scheduler 10 first services the VC waiting on or waiting in this slot. Scheduler 10 then schedules a new target time slot for this VC.

As can be seen from the above description, the functions of the scheduler and transmitter (for transmitting ATM cells) are essentially combined in the present embodiment. Every time a cell is sent on the output, the current value of the CCTP is used to "time stamp" the corresponding VC. The difference between the current value of the CCTP and the previous value of the CCTP at which this VC was last serviced, equals the cell-to-cell spacing measured in terms of the link cell rate. This parameter called the cell to cell spacing (C2CS) 24 is part of the VC descriptor 20 and is used by the scheduler 10 to achieve a given cell rate for each VC. As an example, if the link cell rate is LR cells/sec and the required cell rate for a VC is RCR cells/sec then the cell-to-cell spacing required is C2CS=LR/RCR.

When the scheduler 10 calculates a new target time slot, it services the queues in a particular order of priority. First, the scheduler services VCs in low latency queue 17. If pending queue 17 is empty the scheduler next proceeds to service the VCs in the Current Slot High Priority Pointer (CSHPP), described below. Third, the scheduler services pending queue 16 for high priority traffic. If there is no high priority traffic the scheduler next services the low priority pending traffic. Lastly, if none of the previous queues were serviced and the scheduler is in the normal state, the scheduler then services the VCs in the Current Slot Low Priority Pointer (CSLPP) queue.

Figure 2:
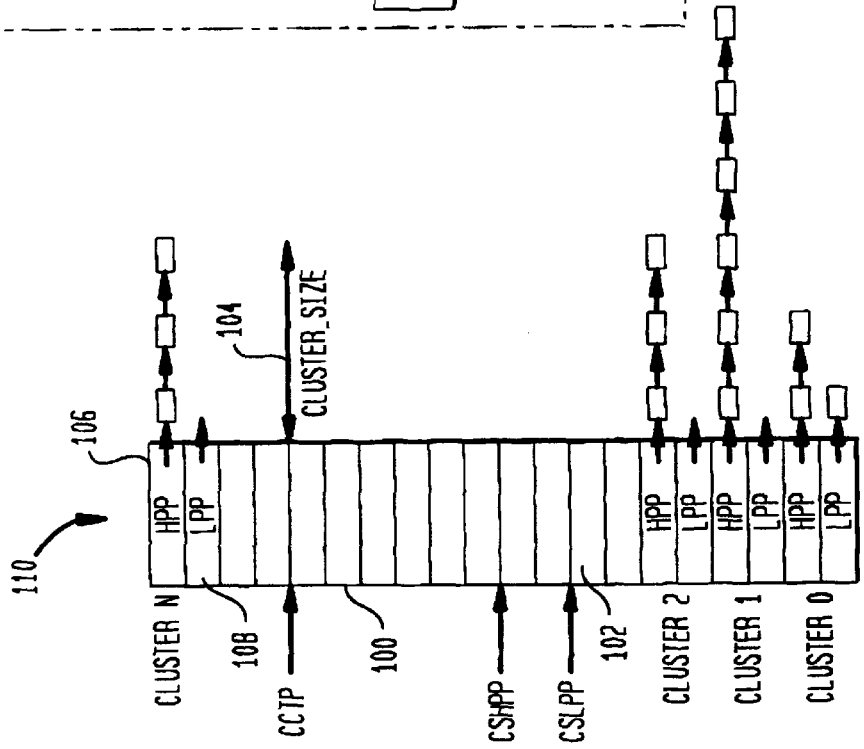
FIG. 2 shows an alternate implementation of a time slot ring according to the present invention.

Referring to FIG. 2, there is shown a time slot ring 100 according to a preferred embodiment of the present invention scheduling mechanism. In the embodiment of FIG. 2, the time slots within the ring 100 are grouped into clusters 102, wherein the ring includes cluster 0 through cluster N. Each cluster nominally holds a number of slots indicative of a Cluster-Size 104. The time slot ring 100 of the instant embodiment contains VCIDs which point to a first VC to be serviced in the cluster. The remaining VCs in a cluster are linked to the first VC via the pointers. In order to accommodate different classes of service, each entry in the ring holds two specific VCIDs: a High Priority Pointer (HPP) 106 which services the VBR/CBR traffic classes and a Low Priority Pointer (LPP) 108 which services VCs belonging to the ABR/UBR classes. Assuming an arbitrary cluster size of 32, for example, the ring size can now be reduced in size by a factor of 32.

In calculating a target slot, the scheduler 110 used in conjunction with the time slot ring 100 calculates a target cluster, rather than the exact target slot. A Current Cell Time Pointer (CCTP) 112 increments every cell time and points to the cell position which will be sent if the scheduler is not backlogged. In a similar fashion, a Current Slot High Priority Pointer (CS HPP) 114 and a Current Slot Low Priority Pointer (CSLPP) 155 point to the current high priority and currently low priority slots, respectively, which are being serviced.

In describing the operation of the scheduling mechanism 110 shown in FIG. 2, it will be understood that the scheduler can be in one of the two states: backlogged or normal. In the normal state, for every increment of the CSHPP or CSLPP 114, the CCTP 112 increments by cluster-size, since a number of cells equal to cluster-size have been sent. Accordingly, the normal state is defined as the case when CSHPP and the CCTP/Cluster-Size value will be in step or in synch with each other. The CSLPP is not considered in determining the state of the scheduler. The scheduler 110 will then first service the high priority queue followed by the low priority queue. The low priority ring is serviced only when the high priority ring is in the normal state and the scheduler encounters an empty slot on the primary ring. Unassigned cells are sent only if both the rings are in the normal state and the total number of cells in both the queues combined is less than the cluster size. The remainder is a variable in the VC descriptor 20 and indicates the accumulated difference between the required cell-to-cell spacing and the actual spacing.

The backlogged case is when the CCTP/Cluster-Size value is greater than the CSHPP. In this case, scheduler 110 will service only the high priority queue. If a cluster 102 is empty, an unassigned cell will be emitted and the CCTP incremented before proceeding to the next cluster. This avoids the empty cluster look ahead requirement, but the trade off is that the scheduler 110, in effect, wastes or does not use one cell time for every empty cluster while it is backlogged. In connection therewith, the fraction of bandwidth not used is then at most (1/Cluster-Size), as will be explained.

Assume that the ring 100 has a capacity to hold R cells. The number of clusters in the ring is therefore (R/Cluster-Size). A worst case for the ring will be when the scheduler has to check all the clusters of the ring and wastes one cell time for every cluster. Accordingly, the fraction of cells wasted is (R/(Cluster-Size*R), which is equivalent to 1/Cluster-Size, as presented above.

Assuming a cluster size of 32, for example, the scheduler 110 will waste 1/32 of the total bandwidth or about 3%. If the higher level call admission control can ensure that no more than 97% of the bandwidth is allotted, the scheduler is then guaranteed to recover from the backlogged condition within one iteration through the ring.

When a target slot is calculated, in the embodiment of FIG. 2, if the target slot turns out to be the current slot itself, then the target slot can only be put in the slot subsequent to the current slot. This holds true for all the virtual channels whose cell to cell spacing is less than the cluster size. This problem is solved by defining another variable called burst-size. In the above example, every time the current cell comes up for transmission, a burst of cells is sent. The C2CS is then adjusted so that the effective rate equals the required rate. A similar problem is encountered when the remainder becomes negative and exceeds the C2CS. The scheduler can correct this by temporarily bursting one extra cell, and adding an amount equal to C2CS to the remainder variable.

The scheduling scheme presented in connection with FIG. 2 has a strict upper limit on the number of accesses to the control memory per cell. As can be seen, however, the total memory required for the ring is now substantially reduced. Considering the design for a 622 Mbps link, assuming a cluster size of 32 cells, the ring size required is only 8294/32~256. Assuming two bytes for the VCID, and two such pointers for high and low priority, we arrive at 1024 bytes. Such a memory requirement can easily be met by the internal cache memory of the SAR chip. Since most of the accesses of the scheduler are to the ring 100, a substantial reduction in the number of external accesses to the control memory is achieved.

As would be understood, the ABR VC can keep hopping between different rates depending on the congestion control algorithm. The rate will be modified by a re-assembly engine when it gets back the Resource Management ("RM") cells which inform the scheduler to either reduce or increase the rate. The re-assembly engine then calculates the required inter-cell gap, in terms of the number of time slots, and fills up the C2CS variable in the per VC record. The scheduler then automatically adapts to the new rate.

In the preferred embodiment described in connection with FIG. 2, the ABR traffic which is on the low priority queue is serviced only after the high priority queue is serviced. In the event the scheduler is back logged, the low priority queue is not serviced. Since achieving an exact bit rate is not critical for the ABR channels, the remainder mechanism can possibly be turned off for these VCs.

As would be understood, the idea of having two queues: one for low priority and one for high priority can be extended to have a greater number of queues to provide for a larger number of traffic classes. This would only be possible, however, at the expense of increased memory requirements.

Figure 3:
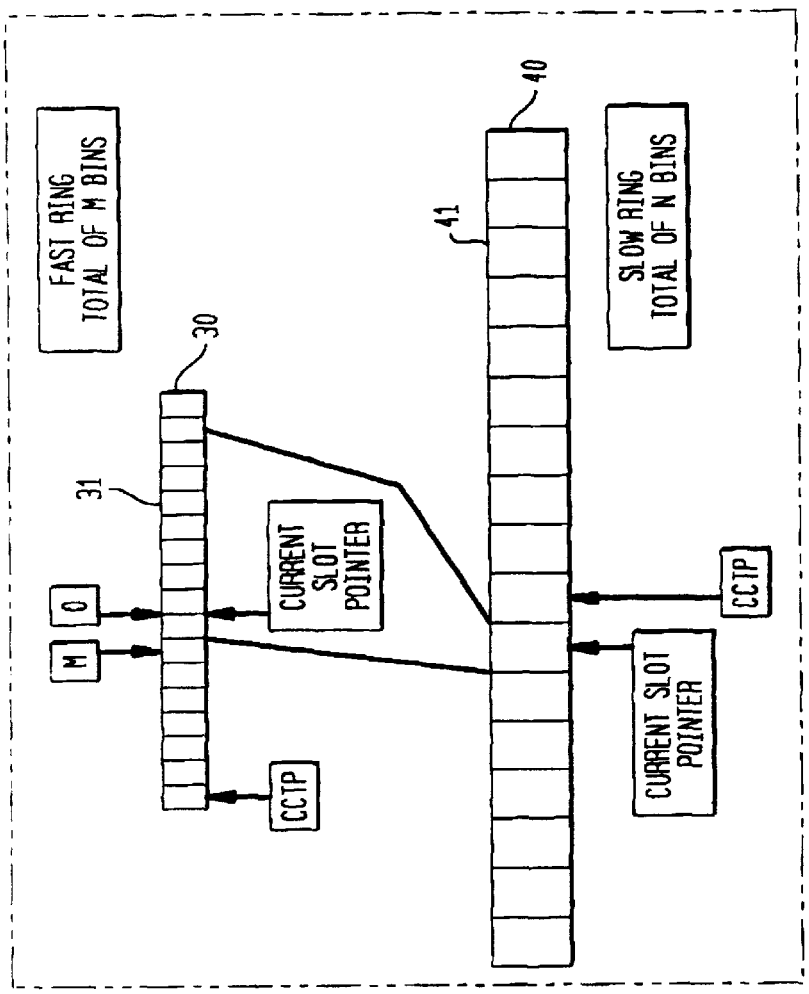
FIG. 3 shows an alternate two ring embodiment of the present invention where high bit rate VCs are serviced by a fine bin size ring and low bit rate VCs are services by coarse bin size rings.

Referring to FIG. 3, another preferred embodiment of the present invention splits adds to the one high latency time slot ring as described above, a second high latency time slot ring, each ring used for a different level of priority of VCs. One of the rings, fast ring 30, will include small cluster sizes comprised of M small slots 31 for high speed, high priority VCs. The other ring, slow ring 40, will have larger cluster sizes comprised of N larger slots 41 for slow speed, lower priority VCs. There are two advantages to this new embodiment. First, higher speed VCs can be given higher priority and consequently suffer less jitter compared with the low speed VCs. Second, the overall memory requirement are lower compared with using a single ring.

The scheduler when calculating the target slot will first see if it can be inserted in fast ring 30, to the extent they fit and to the extent that C2CS of the VC is less than the remaining space in the high speed ring 31. If the target slot can not be fitted on the fast ring 30 it will be put in the appropriate slot on the slow ring 40. The slow and fast rings have their respective current slot pointers and also will have a state either Normal or backed-up. The target slot is calculated with respect to the CCTP as translated to either of the rings. The scheduler, after servicing the low latency pending queue as described above, will first service the fast ring 30 and the slow ring 40 will be serviced only if the fast ring 30 is in the normal state. The minimum number of clusters required in fast ring 30 equals R, where R is the ratio of the size of the cluster in slow ring 40 to the size of the cluster in the fast ring 30. However, better performance is realized when the fast ring is made to have a larger number of clusters than the minimum R. As an example, consider an implementation where the clusters in slow ring 40 is 256 slots and that of fast ring 30 is 32 slots. The minimum number of clusters required in fast ring 30 is 256/32=8. The size of slow ring 40 is dependant as before on the slowest speed to be supported on any given VC.

In considering latency with respect to the present invention scheduling S mechanism, it is known that some applications such as multiprocessing use a local ATM network to interconnect a group of work stations. These applications require VCs with very low latency. There are three main sources which contribute to the latency end-to-end. First, latency due to the protocol stack at the end point work stations. This has to be minimized by bypassing the regular stack for these low latency VCs. Second, latency in the network interface card, which includes the scheduling delay and the delay due to queuing of the cells after scheduling to increase the throughput. Third, the latency suffered in the ATM switching network.

The first source of latency within a network interface card is due to the scheduling delay. The solution to this problem is to create a separate queue reserved for the low latency VCs. Thus, for every cell time, the scheduler should first look at the low latency queue before servicing any other queue. Accordingly, the low latency queue has the highest priority. Also while the scheduler is servicing the low latency queue, the CCTP keeps incrementing. The remainder mechanism will ensure that the transmit rate of the VCs on the high priority queue will not suffer as long as the low latency traffic is kept small in comparison to the other traffic. The other possible source of latency is the queue of cells after the scheduler. A small queue of cells is usually kept to "smooth" the traffic and take care of possible delays in scheduling due to overloading of the control memory bus or the host bus. For the present invention, this queue should be kept to the absolute minimum size.

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined in the appended claims.

What is claimed is:

1. An apparatus for scheduling communications traffic from an end-point host over an ATM network such that a low latency requirement of certain VCs can be satisfied while maintaining overall high throughput, said apparatus comprising:

at least one time slot ring including an array of time slots, wherein each of said time slots includes a virtual channel identifier (VCID) of a virtual channel (VC) to be serviced;

a VC table including an array of VC descriptors, wherein said VCID stored in said time slot ring points to a VC descriptor in said VC table;

processing means for scheduling said VCs in said time slots of said at least one time slot ring, wherein said time slots are circularly processed in a continuous fashion thereby enabling scheduled transmission of ATM cells in said network; and a plurality of pending queues for queuing VCs prior to placement in one of said time slots, said plurality of pending queues including a first pending queue for queuing said low latency VCs so as to be serviced prior to servicing VCs having a less stringent low latency requirement than those VCs queued on said first pending queue.

2. The apparatus of claim 1, wherein said time slot ring is divided into a plurality of clusters, each of said clusters including a predetermined number of slots indicative of a cluster-size, wherein each of said clusters includes at least first and second pointers of differing priority for accommodating transmission under various classes of service from said end-point, wherein multiple VCs for said first and second pointers in a cluster are linked to one another.

3. The apparatus of claim 2, further including a current cell time pointer (CCTP), a current slot high priority pointer (CSHPP) and current slot low priority pointer (CSLPP), wherein only the higher priority queues associated with said first and second pointers of a cluster are serviced during backlog conditions in said time slot ring, a backlog condition being defined as a CCTP value/Cluster-Size>a CSHPP value.

4. The apparatus of claim 3, wherein if a current cluster is empty, said processing means emits an unassigned cell before proceeding to a next cluster.

5. The apparatus of claim 4, further including a burst_size variable, wherein each time said processing means schedules a target slot for a currently active slot, a burst of cells according to said burst_size variable is transmitted during said currently active slot.

6. The apparatus of claim 3, further including a current slot high priority pointer (CSHPP) and a current slot low priority pointer (CSLPP) operable to point to the current high priority and currently low priority slots, respectively, which are currently being serviced.

7. The apparatus of claim 1, wherein said time slot ring is included in internal cache of a segmentation and re-assembly (SAR) applications specific integrated circuit (ASIC).

8. The apparatus of claim 1, wherein said at least one time slot ring includes two time slot rings, each of said time slot rings corresponding to a different C2CS requirement for a VC, and having stored therein VCID's of at least one VC, each of said VCs within a single time slot ring having an equivalent C2CS requirement.

9. A method for scheduling communications traffic over an ATM network such that a low latency requirement of certain VCs can be satisfied while maintaining overall high throughput, said method comprising the steps of:

providing at least one time slot ring including an array of time slots, wherein each of said time slots includes a virtual channel identifier (VCID) of a virtual channel (VC) to be serviced;

referencing a VC table including an array of VC descriptors, wherein said VCID stored in said time slot ring points to a VC descriptor in said VC table, said VC descriptor including pertinent information regarding processing of a specific VC;

circularly processing said time slots of said at least one time slot ring in a continuous fashion at a predetermined rate thereby enabling scheduled transmission of ATM cells in said ATM network;

queuing low latency VCs in a first pending queue having first priority, prior to placement of low latency VC in one of said time slots; and queuing VCs other than said low latency VCs in a pending queue other then said first pending queue prior to placement in one of said time slots.

10. The method of claim 9, wherein said time slot ring is divided into a plurality of clusters, each of said clusters including a predetermined number of slots indicative of a cluster-size, wherein each of said clusters includes at least first and second pointers of differing priority for accommodating transmission under various classes of service from an end-point, wherein multiple VCs for said first and second pointers in a cluster are linked to one another.

11. The method of claim 10, wherein said time slot ring includes a current cell time pointer (CCTP), a current slot low priority pointer (CSLPP) and a current slot high priority pointer (CSHPP) to point to the current low priority and high priority slots, respectively, which are being serviced, wherein only higher priority queues are serviced during backlog conditions in said time slot ring, a backlog condition being defined as a (CCTP/cluster-size) value>a CSHPP value.

12. The method of claim 11, including the step of emitting an unassigned cell before proceeding to a next cluster if a current cluster is empty.

13. The method of claim 9, wherein each of said VC descriptors in said VC table includes a cell-to-cell spacing parameter for each VC, wherein said cell-to-cell spacing parameter is defined as an transmission rate of said output link divided by a required cell rate for said VC, further including the step of altering a cell rate in said time slot ring for different QOS requirements by altering said cell-to-cell spacing parameter in said VC descriptor.

14. The method of claim 13, including the step of calculating a remainder variable for inclusion in said VC descriptor, said remainder variable defined as the accumulated difference between required cell-to-cell spacing and actual cell-to-cell spacing for a VC, said remainder variable operable to ensure that said cell-to-cell spacing averages to said required spacing.

15. The method of claim 9 wherein said circularly processing step comprises a first processing step of R slots of a first one of said time slot ring and a second processing step of one time slot of a second one of said time slot ring, where R equals the ratio of size of a slot of said first time slot ring to the size of a slot of said second time slot ring.

* * * * *